L. R. KRUMM.
DISTANCE CONTROL SYSTEM.
APPLICATION FILED AUG. 21, 1909.
1,003,919.
Patented Sept. 19, 1911.
2 SHEETS—SHEET 1.
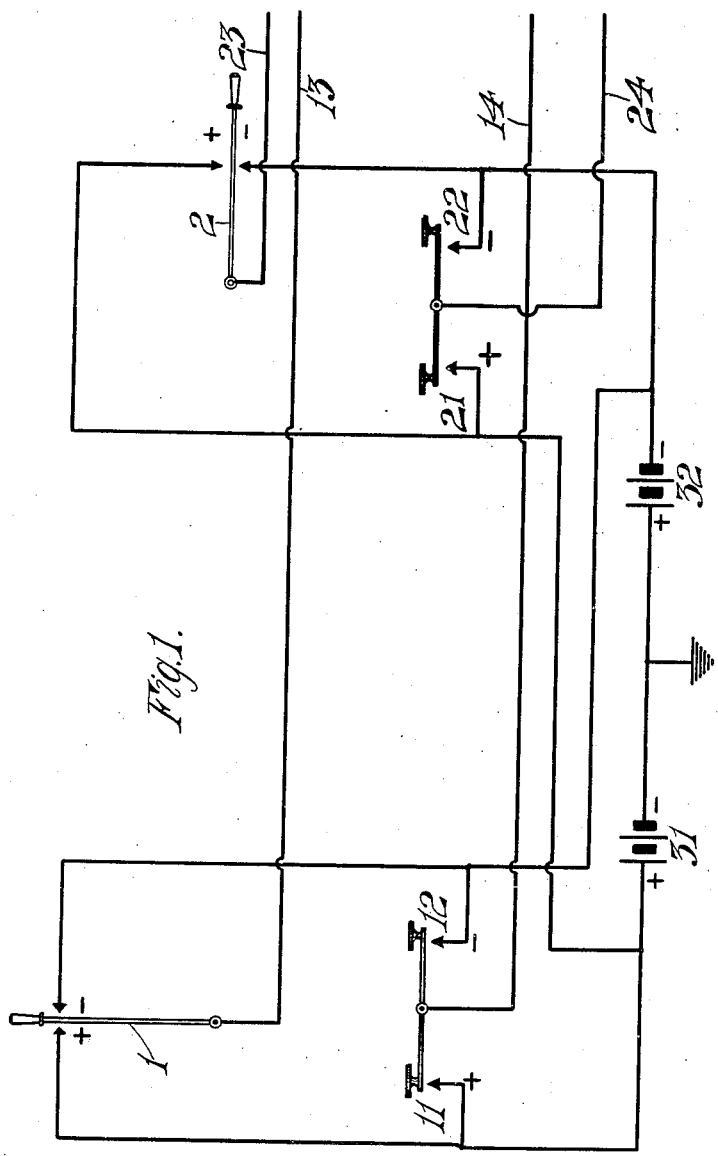
Witnesses:
David S. Hulfish
Wm. Berghahn.
Inventor:
L. R. Krumm
By McMeen & Miller
Attys:

L. R. KRUMM.
DISTANCE CONTROL SYSTEM.
APPLICATION FILED AUG. 21, 1909.
1,003,919.
Patented Sept. 19, 1911.
2 SHEETS—SHEET 2.
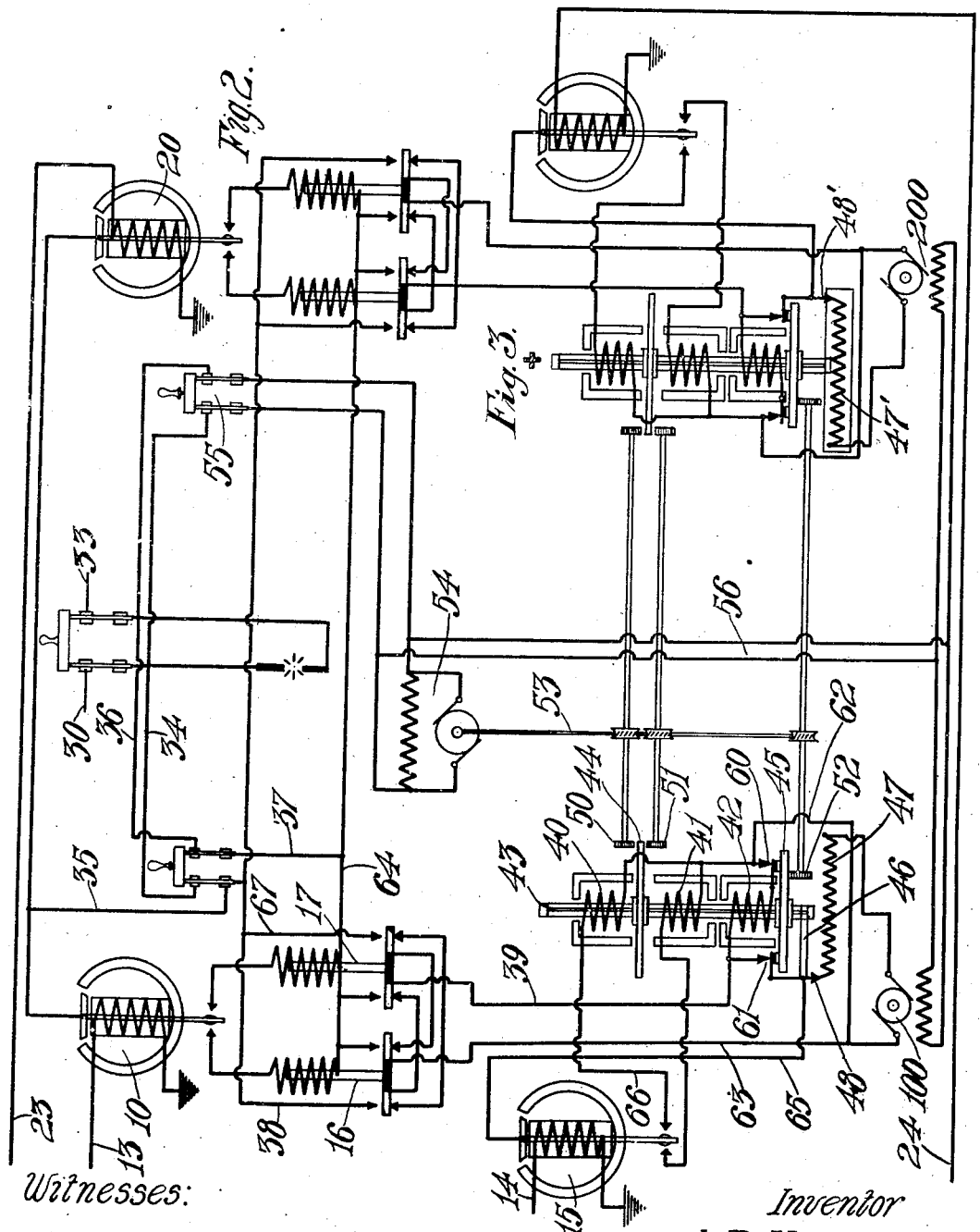
Witnesses:
David S. Hulfish
Wm. Berghahn.
Inventor
L. R. Krumm
By McMeen + Miller
Attys.

UNITED STATES PATENT OFFICE.

LOUIS R. KRUMM, OF COLUMBUS, OHIO.

DISTANCE CONTROL SYSTEM.

1,003,919.        Specification of Letters Patent.     Patented Sept. 19, 1911.

Application filed August 21, 1909. Serial No. 513,947.

*To all whom it may concern:*

Be it known that I, LOUIS R. KRUMM, a citizen of the United States of America, and resident of Columbus, county of Franklin, and State of Ohio, have invented a new and useful Improvement in Distance Control Systems, of which the following is a specification.

My invention pertains to systems and apparatus for controlling electric motors from a distance, and for operating search lights by motors thus controlled. I provide for a search light two motors, one for elevation, and one for traverse control, the two motors being independent. In connection with the two independent motors, I provide two similar systems of motor control.

It is the object of my invention to provide means for moving the search light in any direction and at any desired speed, and at the same time to provide guarding features whereby the apparatus involved will be protected automatically against injury by inadvertent control. For each motor I provide starting and stopping means and speed changing means.

The system of my invention is shown in two sheets of drawings accompanying, in which—

Figure 1 shows the controlling portion of the system, and Fig. 2 the controlled portions. Fig. 3 shows a section of the shaft 43 taken at a portion of its length not engaged in a journal.

The details shown in Fig. 1 are combined into one piece of apparatus, the handles 1 and 2 being adapted to operate in directions corresponding to the resulting movement of the beam of light; 100 is the traverse motor whch controls the movement of the arc light in the horizontal direction, the motor 100 being controlled by contacts of the polarized relay 10 which in turn is controlled by the contacts of the lever 1. For this reason the lever 1 moves in a horizontal direction to close circuit with its contact points while the lever 2 moves in a vertical direction to close circuits with its contact points; the lever 2 controls polarized relay 20 which in turn controls elevating motor 200. The keys 11—12—21—22, which control the speed of the motors are combined in the apparatus of the main governing handle so that the search light can be controlled by one hand if desired. The controlling device operates over four wires, 13, 23, 14, 24, with earth return. Currents of different polarities or direction of flow are sent over these wires depending upon the manipulation of the levers 1 and 2 and of the keys 11—12—21—22. The keys 11 and 12 are mechanically integral as the symbol shows, it being impossible to close both of them at the same time, the double key thus being adapted to connect its wire to the positive side of battery 31 or to the negative side of battery 32 as desired, but not to both. Polarized relay 15 is operated by key 11 or 12. 16 and 17 are relays shown as of solenoid type. 40, 41 and 42 are electromagnets. 43 is a main speed controller shaft on which are mounted two disks, disk 44 presenting a crown gear on both faces and disk 45 presenting a crown gear on its lower face. The shaft 43 also carries the brush arm 46 which controls the effective value of the variable resistance 47. The elements 44, 45 and 46 rotate with the shaft 43. The disks 44 and 45 normally occupy the position shown but are slidable upon the shaft 43 under control of the electromagnets 40, 41 and 42, so that they may be thrown into contact or out of contact with constantly revolving gear wheels adjacent to them. Shaft 43 is formed as shown in Fig. 3, for the portion of its length not utilized as a journal. When the electromagnet 40 is energized, disk 44 is moved into engagement with driving pinion 50. When the electromagnet 41 is energized, disk 44 is moved into engagement with revolving pinion 51. When the electromagnet 42 is energized, disk 45 is drawn out of position for engagement with revolving pinion 52. Pinions 50, 51 and 52 are driven continuously by speed controlling driving shaft 53 which is driven by motor 54 connected to the mains 30, 33 by switch 55. 47 is a resistance in series with the armature of motor 100 or otherwise related to the motor 100 in such manner as to control its speed. The brush 48 engages the resistance 47 to vary its effective value. The traverse motor 100 is shown with its field permanently closed during operation over the circuit wires 56 and through switch 55 to the mains 30 and 33. With the apparatus in the position shown in the figures, the main switches are closed and motor 54 is running continuously and driving continuously the pinions 50, 51, 52, these revolving all in the same angular direction. The operation of pinion 52 is to engage disk 45 when that disk is released by electromagnet 42 and to restore the disk 45, the shaft 43 and the arm 48 to normal position until variable resistance 47 is at its greatest effective resistance value, after which time the pinion 52 does not move disk 45 although the pinion continues to revolve. This may be effected by omitting the teeth of the crown gear at such point that it is not engaged by pinion 52 when disk 45 is in its normal position. The switches 60 and 61 are off-normal switches and are closed when the disk 45 is in its normal position or when the disk 45 is attracted by the electromagnet 42. As the contact 60 controls the circuit of electromagnet 42, it will be noted that when the electromagnet 42 is deënergized, the disk 45 will drop upon the pinion 52, breaking the switch 60 and that electromagnet 42 can not be energized again until restoration to normal of shaft 43 and brush 48 has been effected, thereby mechanically closing switch 60.

The operation of the system is as follows: The operator in charge of the keys of Fig. 1 desiring to swing the search light to the left, will move the controlling lever 1 to the left, thereby closing connection between conductor 13 and battery 31. Current flows from earth through battery 31, lever 1, conductor 13, and relay 10, moving the armature of relay 10 to the left and closing a path over which current flows from power wire 30 through 34, and 35, armature of relay 10, helix of relay 16, conductors 37 and 36 to power conductor 33. This operates relay 16, and closes circuit from power wire 30 through conductors 34 and 38, armature and front contact of relay 16, armature and back contact of relay 17, conductor 39 to a junction point near 42, whence it flows through helix of relay 42, switch 60 and conductor 62 to a junction point near armature of traverse motor 100, flowing also from the first junction point through switch 61, brush 48, resistance 47, armature of motor 100 to the second junction point, thence over conductor 63, front contact of relay 16, and conductors 64, 37, 36 to power conductor 33. Electromagnet 42 is energized and traverse motor 100 is started in such direction as to move the beam of the arc lamp to the left as desired by the operator controlling the handle 1. The motor 100 is moving at its slowest speed since resistance 47 has its highest effective value. To increase the speed of the motor and therefore the angular speed of movement of the arc light, the operator closes key 12 which permits current flow over a path including earth, battery 32, key 12, wire 14 and helix of relay 15, moving armature of relay 15 to the right and closing path for current over 30, 34, 38, 16, 17, 39, 61, 65, 15, 66, 40, 62, 63, 16, 64, 37, 36, 33, energizing electromagnet 40, and drawing disk 44 into engagement with pinion 50 which rotates shaft 43 to move the brush 48 off normal to reduce the effective resistance of 47, thereby increasing the speed of motor 100. When the speed of the motor 100 has increased to the speed desired by the operator, the key 12 is released, but the lever 1 is maintained against its left contact. The electromagnet 40 is deenergized but the electromagnet 42 is held energized, thus stopping the movement of the brush 48, but continuing the rotation of the motor 100 so long as desired. If it is desired later to decrease the speed of the motor 100, the operator closes key 11, thus sending current from earth through battery 31, key 11, conductor 14 and relay 15 moving armature of relay 15 to the left and energizing electromagnet 41, drawing disk 44 into engagement with pinion 51 which results in rotating shaft 43 in reverse direction toward its normal, moving brush 48 and increasing the effective resistance of 47, thereby reducing the speed of motor 100. The speed of motor 100 thus may be set where desired from its minimum to its maximum by control of keys 11 and 12. If it is desired to reverse the direction of rotation of motor 100 to reverse the direction of movement of the search light, the handle 1 is reversed and pressed against its right hand contact. As it leaves its left hand contact, the circuit over wire 13 is broken, relay 10 is deënergized, relay 16 is deënergized and electromagnet 42 is deënergized. Relay 10 immediately is energized to close its contact toward the right and relay 17 immediately is energized to change its armature contacts, but circuit will not be closed through the armature of motor 100 until pinion 52 connecting with the released disk 45 shall have restored disk 45 to normal position, thereby moving brush 48 to normal position, restoring resistance 47 to its greatest effective value and closing off-normal switches 60 and 61. When this has been done current will be traced from power wire 30 through elements 34 and 67, front contact of relay 17, back contact of relay 16, conductor 63, armature of motor 100, resistance 47, brush 48, switch 61, conductor 39, front contact of relay 17, conductors 64, 37, 36 and 33. The electromagnet 42 is in shunt upon the armature 100 as before. The motor 100 will reverse its direction but at its lowest speed, and its speed may be increased as before by operating key 12 or reduced (after having been increased) by operating key 11. The control of the elevating motor is similar.

The rheostat shown in connection with motor 200 comprises fixed brush 48′ and movable resistance 47′.

My speed controller may be of any desired fundamental principle or mechanical form.

In my improved system but five conductors are required between the point of control and the search light or but three wires between the point of control and any single motor, one of which in either case may be earth if desired. It is impossible to close the armature circuit except through maximum resistance, or other condition securing the lowest rate or speed of motor, thus insuring that every time the motor is started, which may be in the reverse direction from previous motion, all circuit conditions are normal and proper for the reverse start.

The speed controlling circuits are operated through relays of the direction-controlling devices, and a reversal of the direction of the main motor involves restoration at the controlled station of all speed controlling conditions, regardless of any conditions which inadvertently may be maintained at the controlling station.

The disk 45 has its friction band or crown gear or other means of engagement with pinion 52, discontinuous in such way that the disk 45 will be disengaged from pinion 52 when resistance 47 is a maximum. The disk 44 similarly disengages mechanically from its driving pinions 50 and 51 when the resistance 47 has been reduced to a minimum and the motor 100 is at its greatest speed.

The shaft 43 has the duty of controlling the speed of motor 100. I have shown a variable resistance in series with the armature as a means by which the speed of the motor 100 is controlled, the means being controlled in turn by the shaft 43. Any known means of varying motor speed may be used, the selected means being controlled by the angular positions of the shaft 43. The governing apparatus is such in design that it may be operated from the same source of current as that supplying the search light.

While I have shown a complete system of a search light controlled by elevating and traversing motors, I may use a single motor for any purpose as, for instance, in elevator work, or a pumping engine controlled from the fire hose nozzle, and control it by three conductors as described fully in connection with traversing motor 100.

Having thus described my invention what I claim as new and desire to secure by United States Letters Patent is:

1. In a distance control system, a controlling device comprising two two-way keys, each adapted to connect its main switch element with either of two batteries of opposite polarities; two conductors connecting said main switch elements to motor controlling devices; a motor; and motor controlling devices adapted to start and stop said motor in response to control by currents over one of said conductors, and to change the speed of said motors within predetermined limits, in response to control by currents over the other of said conductors.

2. In a distance control system, a motor; a speed-governing device; an off-normal switch associated with said speed-governing device; and a starting circuit for said motor and including normally closed off-normal contacts.

3. In a distance control system, a motor; a speed-governing device for said motor; an off-normal switch associated with said speed-governing device; a starting circuit for said motor and including a normally closed contact of said off-normal switch; means for operating said speed-governing device to move it out of normal position; and further means for maintaining said contact while said speed-governing device is out of a normal position, and while said motor is controlled by said starting circuit to continuous rotation.

4. In a distance control system, a motor; a source of current for said motor; a system of relays for starting said motor and adapted to continue the movement of said motor during the continuation of energization of the starting relays of said system; and means for changing the speed of said motor, said speed changing means being operative through contacts of said starting relays closed when said motor is running.

5. In a distance control system, a controlling device comprising switches and sources of currents, said switches being adapted to selectively connect said sources of currents to controlled portion of system; a motor; a rheostat; an off-normal switch for said rheostat; and a starting circuit for said motor and including a normally closed contact in said off-normal switch.

6. In a distance control system, a controlling device comprising switches and sources of currents, said switches being adapted to selectively connect said sources of currents to controlled portion of system; a motor; a speed-controlling device; an off-normal switch for said speed controlling device; and a starting circuit for said motor and including a normally closed contact in said off-normal switch.

7. In a distance control system, a controlling device comprising switches and sources of currents, said switches being adapted to selectively connect said sources of currents to controlled portion of system; a motor; a rheostat; an off-normal switch for said rheostat; and a starting circuit for said motor and including a normally closed contact in said off-normal switch; and an electromagnet energized by current in the said starting curcuit and adapted to hold said contact closed.

8. In a distance control system, a controlling device comprising switches and sources of currents, said switches being adapted to selectively connect said sources of currents to controlled portion of system; a motor; a speed-controlling device; an off-normal switch for said speed-controlling device; and a starting circuit for said motor and including a normally closed contact in said off-normal switch; and an electromagnet energized by current in the said starting circuit and adapted to hold said contact closed.

9. In a distance control system, a motor; starting and stopping means for said motor; speed-governing means for said motor; two conductors and a common return from a distant point of control; and mechanisms whereby currents over one of said conductors operate to control the starting, continuance of rotation, and stopping of said motor in either of its two directions of rotation in accordance with the presence and direction of current passing over said conductors; and whereby currents over the other of said conductors control the speed of rotation of said motor, increasing the speed in response to currents in one direction and decreasing the speed in response to currents in the other direction within predetermined speed limits.

10. In a searchlight control system, motors adapted respectively to impart transverse and elevation movements to said searchlight, controllers for said motors, and constantly rotating means adapted to operate said controller; and means controlled at a distance for applying said rotary means to said controllers.

11. In a searchlight control system, motors adapted respectively to impart transverse and elevation movements to said searchlight, controllers for said motors and constantly rotating means adapted to operate said controllers; distant control means comprising in part switches and sources of currents, said switches being adapted to selectively connect said sources of currents to means adapted to apply said rotary means to said controllers.

12. In a searchlight control system, motors adapted respectively to impart transverse and elevation movements to said searchlight, rheostats for controlling the speed of said motors, and constantly rotating means adapted to operate said rheostats, said constantly rotating means being controlled to operate said rheostats from a distant point.

Signed by me at San Francisco, county of San Francisco and State of California this 13 day of August 1909.

LOUIS R. KRUMM.

Witnesses:
GEO. A. SCOVILLE,
WM. S. ULMER.